United States Patent [19]

Garrone

[11] 3,710,561
[45] Jan. 16, 1973

[54] APPARATUS FOR SEPARATING SOLID PARTICLES SUSPENDED IN A GASEOUS STREAM

[75] Inventor: Franco Garrone, Bologna, Italy
[73] Assignee: AMF Incorporated
[22] Filed: Dec. 4, 1970
[21] Appl. No.: 95,214

[30] Foreign Application Priority Data

Dec. 24, 1969 Italy................................7536 A/69

[52] U.S. Cl. .........................55/429, 55/432, 55/461
[51] Int. Cl. ..............................................B01d 45/12
[58] Field of Search............55/1, 343, 429, 461, 432

[56] References Cited

UNITED STATES PATENTS

| 821,819 | 5/1906 | Neumann | 209/144 |
| 2,221,385 | 11/1940 | Rogers | 55/461 |
| 1,838,117 | 12/1931 | Simms et al. | 55/461 |

FOREIGN PATENTS OR APPLICATIONS

| 236,452 | 7/1925 | Great Britain | 55/461 |
| 345,233 | 12/1921 | Germany | 55/461 |

Primary Examiner—Bernard Nozick
Attorney—George W. Price and Eli Weiss

[57] ABSTRACT

In this apparatus, a stream of gas having particles of dust is subjected to a change of direction such as, for example, a 90° turn. As the stream of gas is turned, the particles of dust which are suspended in the gas, and being heavier than the gas, tend to collect and form a lamina of dust particles along the inner surface of the wall forming the outside curve of the turn through the action of centrifugal force. The lamina of dust particles is deflected out through an opening in the wall forming the outside curve of the turn, and the clean air which is positioned adjacent the inside curve of the turn is directed passed the opening.

1 Claim, 5 Drawing Figures

INVENTOR.
FRANCO GARRONE
BY
Eli Weiss
ATTORNEY

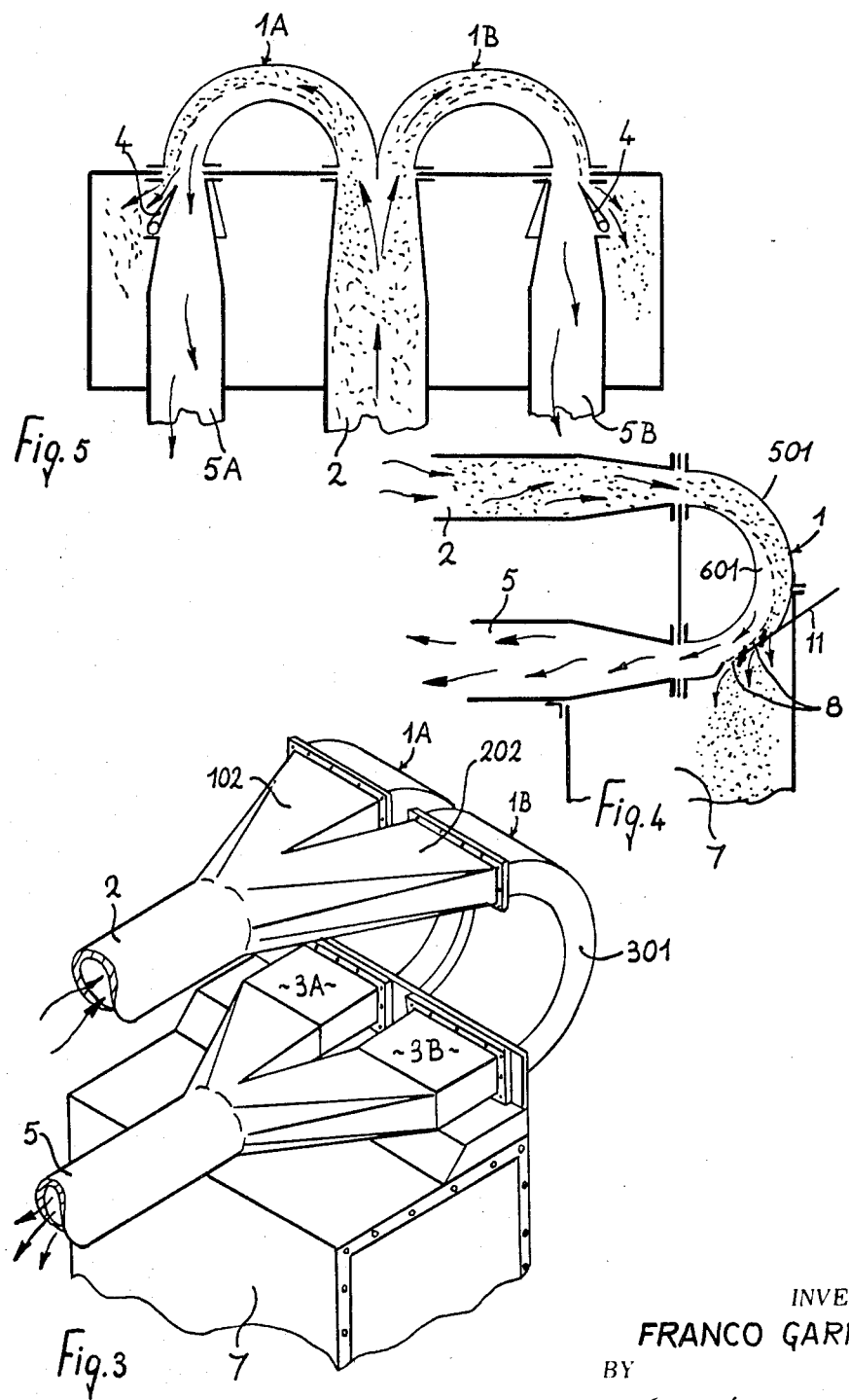

APPARATUS FOR SEPARATING SOLID PARTICLES SUSPENDED IN A GASEOUS STREAM

This invention relates generally to a device for removing solid or liquid particles from a gaseous stream and, more particularly, to a device wherein centrifugal force is utilized to separate solid particles held in suspension in a dust-laden stream of air.

Usually, devices commonly referred to as separating cyclones are used to separate solid particles suspended in a gas stream. In this connection, the cyclones use centrifugal force which is developed by impressing a spiral or quick whirling motion to the stream. A particularly simple type of cyclone separation comprises a vertical axis cylindrical chamber, closed at the top and having a hopper at the bottom, the hopper being provided with an opening and a discharge valve. The duct that carries the gas that is to be cleaned is jointed tangentially at the chamber while the duct for the gas that has been cleaned is connected to be coaxial to the chamber.

In this arrangement, the gas whirling motion occurs spontaneously due to the tangential introduction of the gas to be cleaned into the chamber. The dust in the gas stream is propelled outward and moves along the chamber side walls to the hopper-shaped bottom from where the dust is collected and periodically discharged to the outside by opening a valve in the bottom of the chamber.

Other types of cyclone separators are also known. In one type, for example, the cleaning of the gas occurs in two successive stages. In the first stage, dust collection is effected through a ring of peripheral paddles.

In another type of separator, a rotor similar to that type used on centrifugal fans is used to impart a whirling motion to the gas that is to be cleaned. Suitable chambers, open at the side of a spiral-shaped shell collect the solid particles.

While many of these devices have reached a high degree of separating efficiency, they have also introduced into the pneumatic circuit a considerable load loss which can be serious and troublesome in those instances where the cleaned gas is utilized in subsequent procedures.

This invention is directed at reducing the load loss and, for this purpose, there is provided a dust remover or separator in which, although the centrifugal force separating action is utilized, the air does not follow a whirling or spiral path. Additionally, the equipment is compact in size to effect a saving in material and reduce the space needed for installation.

In this invention, the dust separator includes a duct that can be rectangular in cross section and curved to provide a semi-circular path for gas that flows through the duct. The rectangular duct has a width that is relatively wide when compared to its depth. When arranged in a vertical plane, the upper end of the rectangular duct is jointed to a cylindrical duct which carries the dust-laden air, and the cross sectional area of the cylindrical duct can be substantially equal to the cross sectional area of the rectangular duct section. The bottom end of the rectangular duct is jointed to a discharge duct which can be rectangular in section and diverge in the direction of gas flowing through the duct. The diverging discharge duct is coupled to a wedge-shaped blade, hinged at one end and adjustable to form a louver which extends into the duct through the wall forming the outside curve. The suspended solid particles separated from the gas stream by centrifugal force form a layer of dust adjacent to the surface of the wall of the duct forming the outside curve and are subsequently deflected downward by the blade into a collecting chamber positioned beneath the blade. The cleaned air passes over the top of the blade and is conveyed towards the discharge duct. The structure of this invention utilizes the principles of centrifugal force to separate dust from a gas stream without inducing a whirling or spiral motion to the gas stream. In this manner, the load loss of the stream during the removal of dust is reduced to a minimum.

The novel features that are considered characteristic of this invention are set forth with particularity in the appended claims. The invention itself, however, both as to its organization and method of operation, will best be understood from the following description when read in connection with the accompanying drawings wherein:

FIG. 3 is a perspective view of structure in accordance with the principles of the invention illustrating two vertical separating chambers coupled to common inlet and outlet ducts;

FIG. 4 is a cross sectional view of still another embodiment of structure in accordance with the principles of the invention; and FIG. 5 is a cross section of another embodiment of a dust separation and discharge system in accordance with the principles of the invention.

Figure 1:
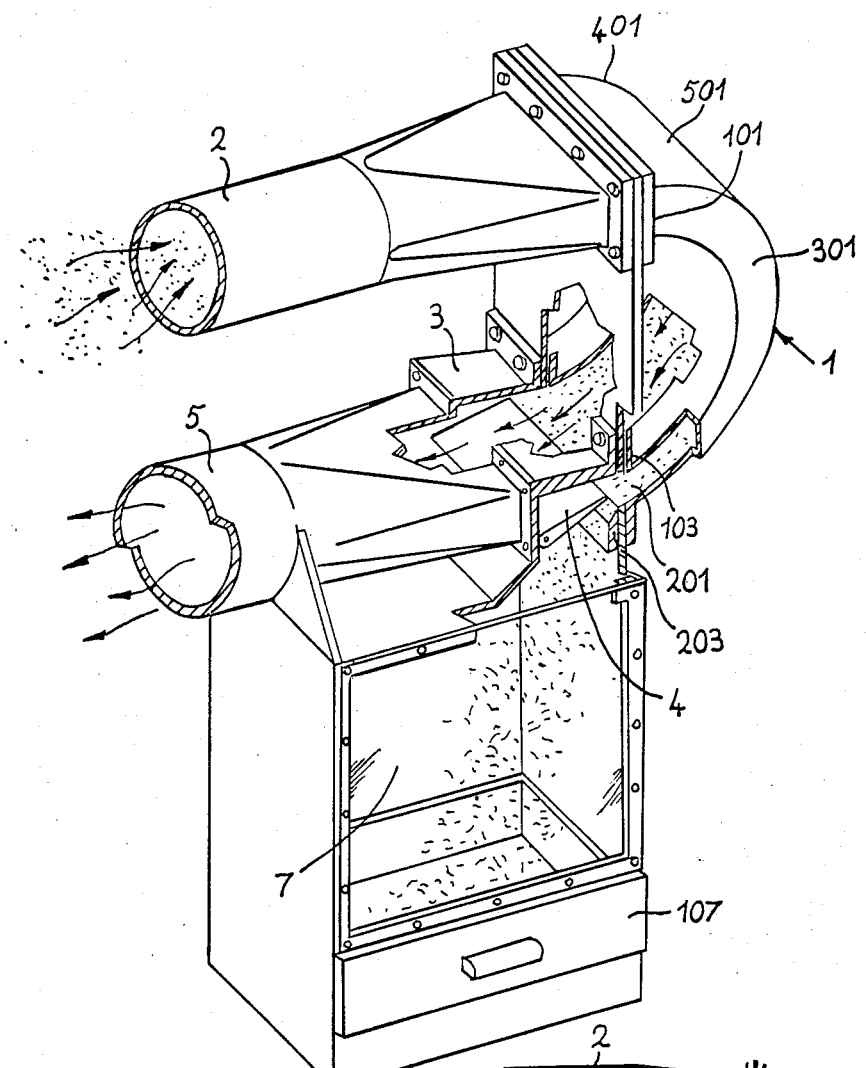
FIG. 1 is a perspective, partially in section, of an embodiment of a dust separator in accordance with the principles of the invention.
Figure 2:
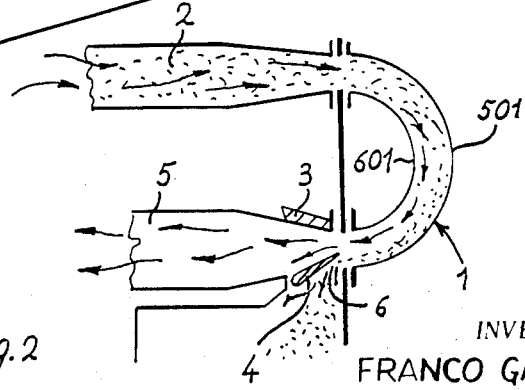
FIG. 2 is a schematic view in section, of a portion of the structure of FIG. 1.

Referring specifically to FIGS. 1 and 2, there is illustrated structure in accordance with the principles of the invention of a dust separator having a separation chamber 1 that is rectangular in cross section and curved to provide a semi-annular or semi-circular path for a gas passing through. The cross sectional shape of chamber 1 can be of a relatively long and narrow rectangular profile where the ratio between the long and short side of the rectangle is at least greater than one and can be greater than seven.

The separation chamber 1 extends for an angular path of substantially 180° and supports an upper opening 101 and a lower opening 201, where each opening is substantially on a same vertical plane. The upper opening 101 is coupled to the inlet duct 2 of a gas stream such as air which is to be cleaned of dirt particles. Duct 2 is usually cylindrical in shape and the area of the circular section of the duct should be substantially equal to or larger than the area of the rectangular opening 101 to which the duct is coupled. The coupling between chamber 1 and duct 2 can converge gently in the direction of motion of the gas to provide a gentle passage between the section of duct 2 and the rectangular section of dust separator 1. In the converging position, in the conversion from the circular section to the rectangular section, the total taper or convergency factor, relative to the long side of the rectangular inlet section can be equal to or less than 12°.

The lower or outlet opening 201 of the chamber is connected to a rectangular section flange joint 3 which diverges in the direction of the flow of the air stream. Flange joint 3 has, in the area of flange 103, a longitudinal chamfered rim 203 on which the edge of a blade 4 strikes. The blade 4 can be wedge-shaped or have some other streamline profile. The blade is mounted to rotate about a pin and is positioned in front of and along an axis parallel to the length of opening 201.

The blade 4 is pivoted about its axis to provide a dirt exhaust opening 6 of a desired size between the blade edge and the chamfered rim 203. The dirt exhaust opening 6 which is defined at its sides by walls 301, 401 of chamber 1, communicates with a sealed box 7. The dirt exhaust opening 6 which is adjacent to the most external wall 501 of curved chamber 1 can be considered to be contiguous with the wall forming the outside curve and is formed by the blade 4 extending into the chamber through the outside curved wall. The blade 4 is positioned to provide an opening 6 having an area that is not less than a third of the area of the outlet opening 201 of separation chamber 1.

In operation, a stream of gas such as air or the like containing dust or other particles of dust is conveyed at a certain flow speed to the inlet of chamber 1. The chamber, being curved, forces the gas to experience a change of direction of approximately 180°. Referring to FIG. 2, as the stream of gas is turned, the particles of dirt suspended in the air, and being heavier than the air, tend to collect against the inner surface of the wall 501 forming the outside curve of chamber 1 through the action of centrifugal force. This gives rise to the formation of a very dusty air lamina having a decreasing thickness downstream or in the direction of the air stream motion. The lamina of solid particles, which is moving in the same direction as the air stream, enters dirt exhaust opening 6 and collects in box 7. The bottom of box 7 can be provided with a drawer 107 or other suitable arrangement for the periodic discharge or removal of the collected dust.

At the same time, in the semi-annular chamber 1 the cleaned air forms a lamina in the area of the wall 601 which forms the inside curve wall. The clean air lamina grows increasingly thicker as it progresses downstream or in the direction of the air motion through said chamber. This air, which has been cleaned of solid particles, enters joint 3 passing above the blade 4 and is subsequently fed to discharge duct 5.

By decreasing or increasing the flow rate of the dust-laden air speed, and by varying the size of the dirt exhaust opening 6 through an adequate adjustment of the angle of inclination of blade 4, high dirt or particle separating efficiencies can be obtained.

Referring now to FIG. 3, there is illustrated structure wherein a stream of dust-laden gas is fed from a common inlet duct to a common outlet duct through two semi-annular separation chambers 1A and 1B operating in parallel and having a common dust collecting box 7.

FIG. 4 illustrates another embodiment of the invention wherein the single separating blade 4 has been replaced with a plurality of blades arranged in tandem, one behind another, and adjustable in synchronism by element 11 with each other to vary the size of each of the dirt or duct exhaust openings 8.

It is to be understood that the separation chamber 1, and/or 1A, and 1B are not restricted to being in a vertical plane as in FIGS. 1 and 2, but can assume, if desired, any other suitable positioning. For example, the chambers can be arranged in a horizontal position if desired, as schematically illustrated in FIG. 5.

Additionally, it is to be understood that while the semi-annular shaped separation chambers 1, 1A, 1B have been illustrated as having a chamber of constant rectangular cross section, it is also possible to provide a chamber having a variable section. For example, the chamber can be made with a decreasing cross section from the inlet to the outlet or vice versa respectively to increase the separating centrifugal force action and to further decrease the pressure drop present in the device. Furthermore, the chambers are not restricted to the particular number or shape shown, but the number of chambers can be increased to more than one in number and can have a shape, in section, that is other than rectangular. It is also noted that the separation chamber can have a shape and provide a path for the flowing gas that is other than semi-annular in shape and can be greater or less than 180°. For example, the chamber can have a shape that will provide a complete turn of 360° or more, in which case, the chamber can assume a helical or scroll configuration having one or more coils and/or fractions of a coil. Still further, the structure here disclosed can be used for purposes other than dust separation from air.

Obviously many modifications and variations of the present invention are possible in the light of the above teaching. It is, therefore, to be understood that the invention may be practiced otherwise than as specifically described herein.

What is claimed is:

1. Apparatus for separating dust from a stream of gas, which comprises:
   a continuously curved gas separation chamber having an inner wall and an outer wall and a cross sectional configuration that is wider than it is deep,
   said chamber including an inlet opening at one end thereof for receiving a stream of gas containing dust, an outlet opening at the other end thereof for discharging gas and an aperture provided in the outside wall adjacent the outlet opening,
   a first blade mounted in the aperture for separating dust from the stream of gas,
   a second blade mounted in the aperture upstream of the first blade for separating dust from the stream of gas,
   means to pivot said first blade to change its angle relative to the direction of flow of the stream of gas,
   means to pivot said second blade to change its angle relative to the direction of flow of the stream of gas,
   means for moving said first and second blades in unison, and
   an exhaust compartment communicating with the aperture to receive dust separated from the stream of gas.

* * * * *